United States Patent [19]
Purits

[11] Patent Number: 5,940,500
[45] Date of Patent: Aug. 17, 1999

[54] SERIES EQUIPMENT WITH DC LINE HOLD TRANSFER

[75] Inventor: Valentin Purits, Heuvelton, N.Y.

[73] Assignee: Mitel, Inc., Reston, Va.

[21] Appl. No.: 08/843,250

[22] Filed: Apr. 14, 1997

[51] Int. Cl.$^6$ .................................................. H04M 1/00
[52] U.S. Cl. ........................ 379/399; 379/387; 379/398
[58] Field of Search .................................... 379/393, 399, 379/413, 402, 398, 387

[56] References Cited

U.S. PATENT DOCUMENTS

| | | | |
|---|---|---|---|
| 4,322,586 | 3/1982 | Mein . | |
| 4,926,466 | 5/1990 | Ayello et al. | 379/143 |
| 5,315,644 | 5/1994 | Lester et al. | 379/103 |
| 5,448,624 | 9/1995 | Hardy et al. | 379/67 |
| 5,459,440 | 10/1995 | Claridge et al. | 333/17.3 |
| 5,790,656 | 8/1998 | Rahamim et al. | 379/399 |

OTHER PUBLICATIONS

Newton's Telecom Dictionary, 8$^{th}$ Edition p. 125 "Bandpass filter", 1994.

Primary Examiner—N. Le
Assistant Examiner—Shih-Wen Hsieh
Attorney, Agent, or Firm—Pascal & Associates

[57] ABSTRACT

A telephone series equipment line circuit for connection between a central office (CO) line and a terminal equipment (TE) line comprising a filter connected between the lines for blocking message signals from passing therebetween and for passing direct current (DC), a DC bypass circuit including a first series switch apparatus connected between the lines around the filter, series equipment connected via a DC blocking circuit and second series switching apparatus to the lines, the first switch apparatus being open and closed reciprocally to the second switch apparatus.

8 Claims, 2 Drawing Sheets

SERIES EQUIPMENT WITH DC LINE HOLD TRANSFER

FIELD OF THE INVENTION

This invention relates to the field of telephony, and in particular to a circuit for interfacing a central office line and terminal equipment with series equipment.

BACKGROUND TO THE INVENTION

Series equipment is sometimes connected between a central office (CO) line and terminal equipment such as PABXs to provide specialized services, such as call redirection, data modification, automatic recall, etc. Typically the terminal equipment is connected either in series with the CO line, or is connected in series with the series equipment to the CO line. In the first case, the series equipment must have a hold circuit to hold the CO line "off-hook" while the series equipment is in series with the terminal equipment line and the CO line. In the second case the series equipment must include a battery feed to supply a hold circuit in the terminal equipment while the series equipment is in series with the terminal equipment line and the CO line.

The hold circuit typically consumes up to three watts of power, and is required to meet stringent overvoltage safety requirements. The battery feed supplies the internal terminal equipment hold circuit with direct current, and dissipates power and has strict noise requirements. These circuits have been found to dissipate the majority of the power used by the series equipment.

The dissipation of power, the meeting of overvoltage requirements and the meeting of noise requirements are all undesirably expensive.

FIG. 1 is a schematic diagram of series equipment in accordance with the prior art. Terminal equipment 1 is connected via tip and ring leads of a terminal equipment line 3 to tip and ring leads 5 of a central office (CO) line, through double pole double throw contacts 7 of a relay. Typically a protective device 9 such as a varactor is connected across the CO line.

When the contacts 7 are in one position, the terminal equipment is connected directly (cut through) to the CO line, and therefore the direct current supplied via the CO line is applied to the terminal equipment, to supply the internal terminal equipment hold circuit, for example. When the contacts 7 are in another position, the cut through connection is severed, and the terminal equipment is connected to the series equipment 11.

The connection of the terminal equipment through contacts 7 in the latter position is via DC blocking capacitor 13 and bidirectional amplifiers 15 to signal processing circuits 17, such as audio paths, a modem, a dual tone multifrequency (DTMF) transceiver, etc., which can be controlled by a microprocessor 19. The signal processing circuits 17 are also connected via bidirectional amplifiers 21, impedance matching circuit 23 and capacitor 25 to one winding of transformer 27.

The other winding of the transformer is connected via DC blocking capacitor 29 to the tip and ring leads of the CO line 5.

Due to there being DC blocking elements in series with the CO line 5 and the terminal equipment line 3, the internal hold circuit in the terminal equipment cannot be used to hold the CO line. Therefore a separate hold circuit 31 is connected across the CO line 5. Another contact 33 is connected in series with the hold circuit and the connection of the transformer 27, and the CO line.

Also due to the aforenoted DC blocking elements, current from the CO line cannot be used to feed the terminal equipment line 3. For that reason a battery supply circuit 35 is connected across the terminal equipment line, via contacts 7.

In operation, with the contacts 7 in one (upper) switched position, and with contact 33 open, the terminal equipment line 3 is cut through to the CO line 5. DC is supplied from the CO line to the terminal equipment, and the internal hold circuit in the terminal equipment can hold the CO line offhook.

With the contacts 7 in the other (lower) switched position, and with contact 33 closed, a DC path from the CO line 5 to the terminal equipment line 3 is blocked, but there is an AC path between the lines via the series equipment 11. Due to the blocked DC path, DC current is supplied from battery supply circuit 35, and separate hold circuit 31 is connected to the CO line 5.

SUMMARY OF THE INVENTION

The present invention provides a series equipment circuit between the CO line and terminal equipment line which allows DC current to be provided from the CO line to the terminal equipment line. It also allows the terminal equipment hold circuit to hold the CO line offhook. Neither a special DC supply circuit nor a separate hold circuit is required in the series equipment, as is required in the prior art circuit. This reduces both equipment cost and wastage of power caused by dissipation.

In accordance with an embodiment of the invention, a telephone series equipment line circuit for connection between a central office (CO) line and a terminal equipment (TE) line is comprised of a filter connected between the lines for blocking message signals from passing therebetween and for passing direct current (DC), a DC bypass circuit including a first series switch apparatus connected between the lines around the filter, series equipment connected via a DC blocking circuit and second series switch apparatus to the lines, the first switch apparatus being open and closed reciprocally to the second switch apparatus.

The series equipment can thus be devoid of a CO line hold circuit, and devoid of a separate battery feed circuit for the terminal equipment.

BRIEF INTRODUCTION TO THE DRAWINGS

A better understanding of the invention will be obtained by considering the detailed description below, with reference to the following drawings, in which:

FIG. 1 is a schematic diagram of a series equipment line circuit in accordance with the prior art, and FIG. 2 is a schematic diagram of a series equipment line circuit in accordance with a preferred embodiment of the present invention.

DETAILED DESCRIPTION OF THE PREFERRED EMBODIMENT

Figure 2:
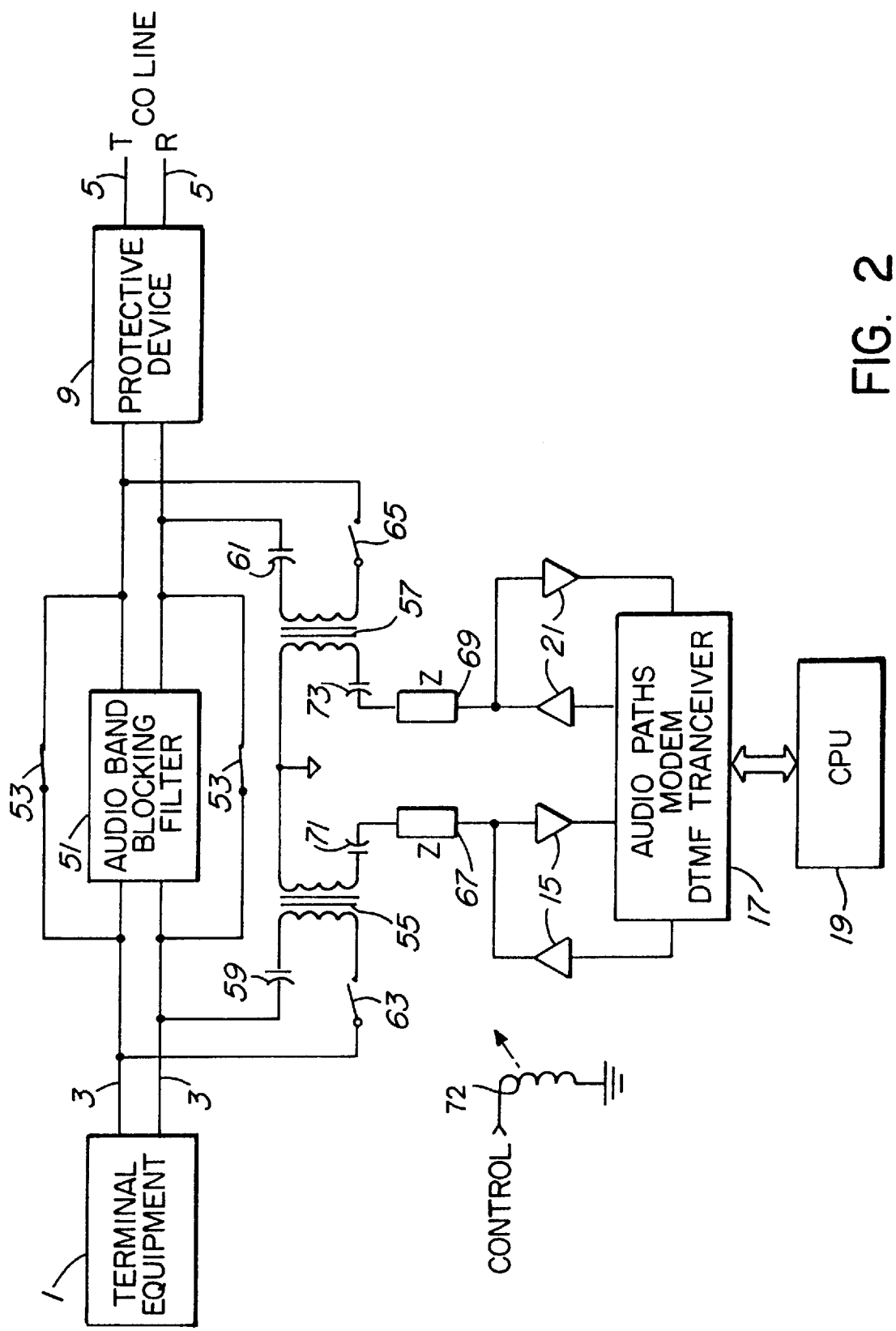

Turning to FIG. 2, the CO line 5 is connected to the terminal equipment line 3 via a filter 51, which blocks message signals but allows DC current to pass. Message signals should be construed to include audio band signals, such as voice signals, DTMF signals, data signals, control signals, etc., i.e. signals which are to be communicated between the CO line and the terminal equipment line.

Contacts 53 bypass the filter 51, connect the tip leads of the lines together, and connect the ring leads of the lines together, around filter 51.

Therefore, with contacts 53 open, DC current passes through filter 51, but message signals are blocked. With contacts 53 closed, both message signals and DC current pass through contacts 53. Thus with contacts 53 closed, the message signals and DC current are passed between the lines 3 and 5 similar to the prior art circuit of FIG. 1.

The series equipment is connected via respective windings of transformers 55 and 57, capacitors 59 and 61 and contacts 63 and 65 to terminal equipment line 3 and CO line 5 respectively. The other windings of transformers 55 and 57 are connected via impedance matching circuits 67 and 69, and series capacitors 71 and 73 to bidirectional amplifiers 15 and 21, which are connected to signal processing apparatus 17, which is controlled by microprocessor 19.

When contacts 53 are open, contacts 63 and 65 are closed (and when contacts 53 are closed, contacts 63 and 65 are reciprocally open), and message signals pass between lines 3 and 5 via capacitors 59 and 61, transformers 55 and 57, impedance matching circuits 67 and 69, bidirectional amplifiers 15 and 21, and signal processing apparatus 17. In this case, since there is a DC path between the terminal equipment line 3 and the CO line 5, DC current is still being supplied from the CO line 5 to the terminal equipment line 3, and the internal hold circuit of the terminal equipment can be used to hold the CO line offhook.

Figure 1:
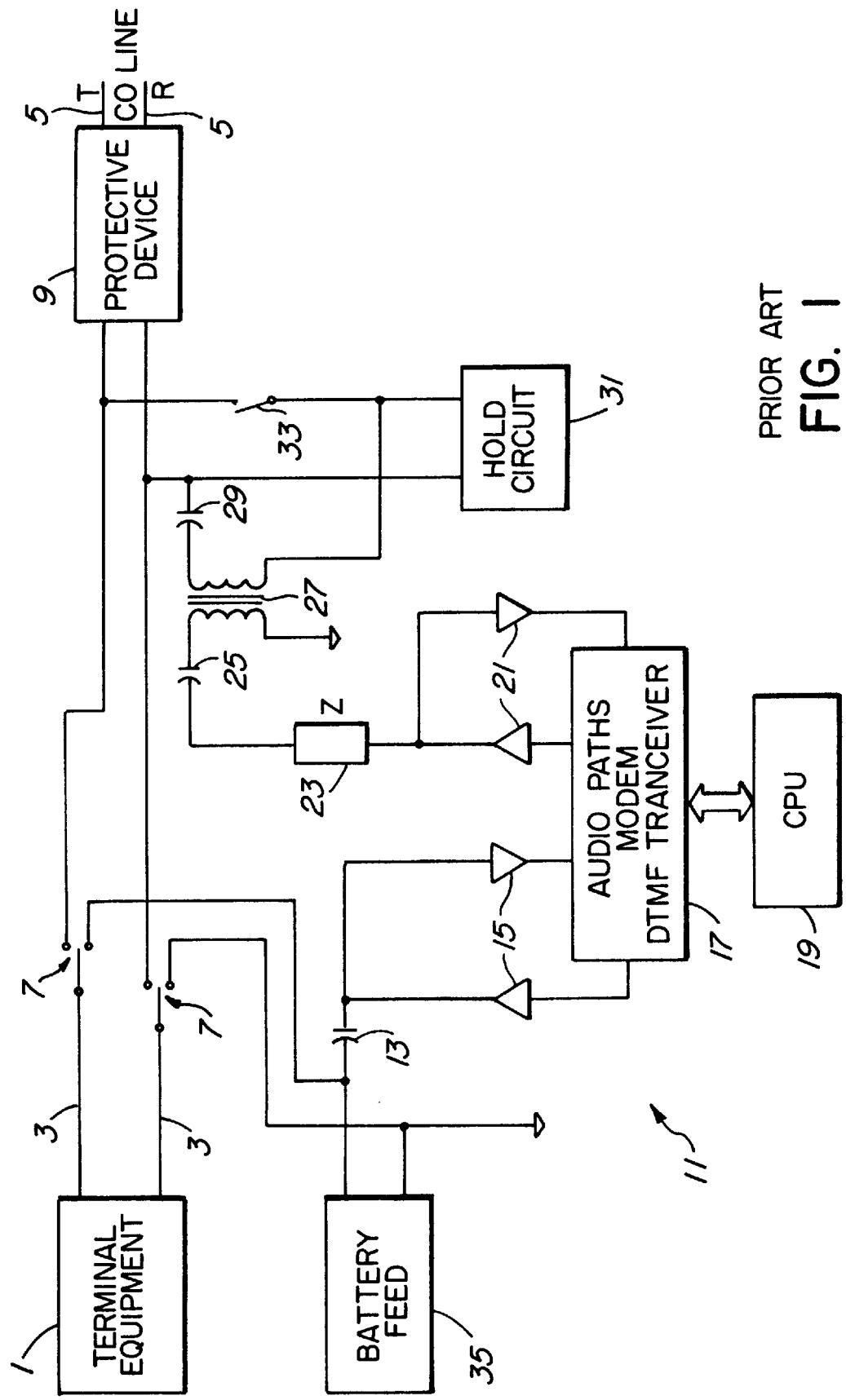

Thus no separate DC current supply circuit such as 35 in FIG. 1, and no separate hold circuit such as 31 in FIG. 1 are required to be used in the circuit of FIG. 2. Equipment cost and power consumption are thereby reduced.

The contacts 53 and 63 and 65 can be part of a single relay 72, or contacts 53 can be part of one relay and contacts 63 and 65 can be part of another relay. However during stable states contacts 53 should be open or closed reciprocally to contacts 63 and 65.

It will be recognized that the signal processing apparatus is not limited to mere passage of message signals; it can be used to modify signals arriving from any of the lines before transmitting the modified signals to the other line, it can generate DTMF or other signals, generate control signals e.g. under control of the microprocessor, etc.

It should also be recognized that the contacts 53, 63 and 65 could be other forms of switches, such as semiconductor solid state switches. The filter 51 could be an active filter, a passive filter, or a high AC impedance, DC drive circuit, and if desired its bandwidth can be restricted to the audio frequency band. Transformers 55 and 57 can be replaced by isolation amplifiers. If balance or safety requirements allow it, transformer 55 can be replaced by another form of AC conducting circuit.

A person understanding this invention may now conceive of alternative structures and embodiments or variations of the above. All those which fall within the scope of the claims appended hereto are considered to be part of the present invention.

I claim:

1. A telephone series equipment line circuit for connection between a central office (CO) line and a terminal equipment (TE) line comprising a filter connected between said lines for blocking message signals from passing therebetween and for passing direct current (DC), a DC bypass circuit including a first series switch means connected between said lines around the filter, series equipment connected via a DC blocking circuit and second series switching means to said lines, said first switch means being open and closed reciprocally to the second switch means.

2. A line circuit as defined in claim 1 wherein the series equipment is devoid of a CO line hold circuit.

3. A line circuit as defined in claim 2 in which the series equipment is comprised of DC isolating means for blocking DC from passing from either of the lines into the series equipment.

4. A line circuit as defined in claim 3 in which said switching means is comprised of relay contacts.

5. A line circuit as defined in claim 3 in which the filter is an audio band blocking filter.

6. A line circuit as defined in claim 1 in which each of said lines is comprised of tip and ring lead pairs, the first switch means is comprised of a pair of first relay contacts respectively connected between said tip leads and between said ring leads; the series equipment is comprised of a pair of transformers, a primary winding of each of the transformers being connected via a corresponding capacitor to a corresponding one of the tip and ring leads and via a second relay contact to another one of the tip and ring leads, and secondary windings of the transformers being connected via bidirectional audio frequency paths and impedance matching means to signal processing apparatus, the series equipment being devoid of a CO line hold circuit.

7. A line circuit as defined in claim 6 in which the first and second relay contacts are operationally associated with a single relay.

8. A line circuit as defined in claim 6 in which the signal processing apparatus is comprised of at least one of a modem and dual tone multifrequency (DTMF) transceiver.

* * * * *